Sept. 12, 1950

J. W. KAPPEN 2,521,727

MATERIAL HANDLING APPARATUS

Filed Aug. 7, 1945

INVENTOR.
John W. Kappen
F. C. Walker
BY

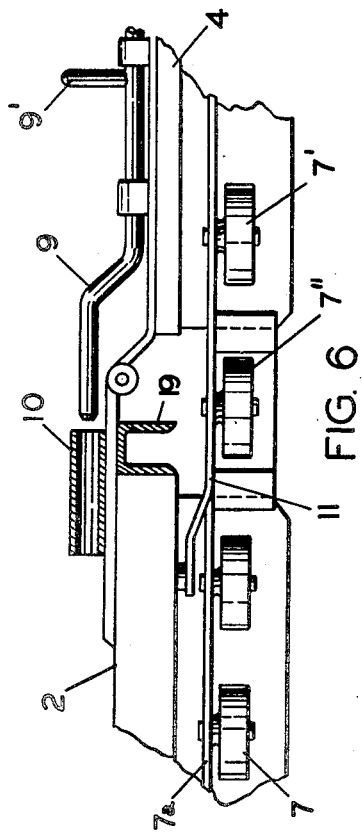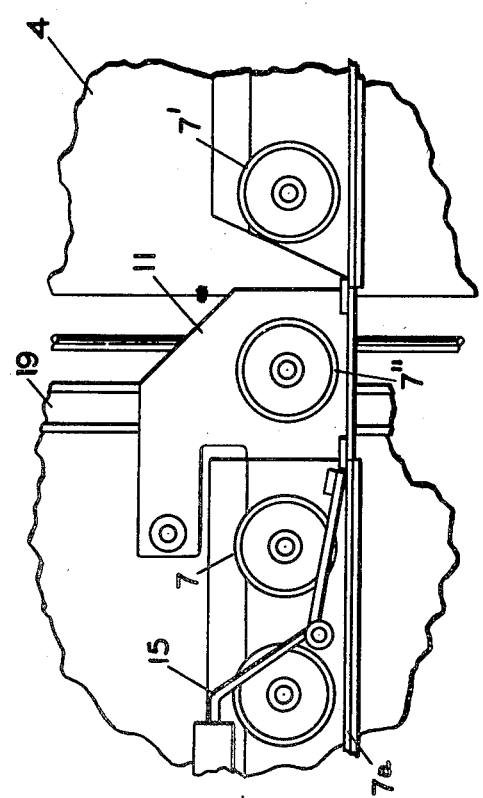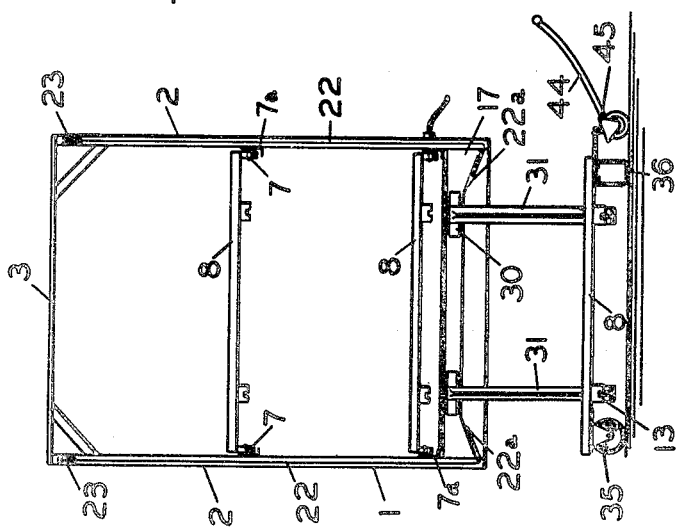

Sept. 12, 1950 J. W. KAPPEN 2,521,727
MATERIAL HANDLING APPARATUS
Filed Aug. 7, 1945 7 Sheets-Sheet 4
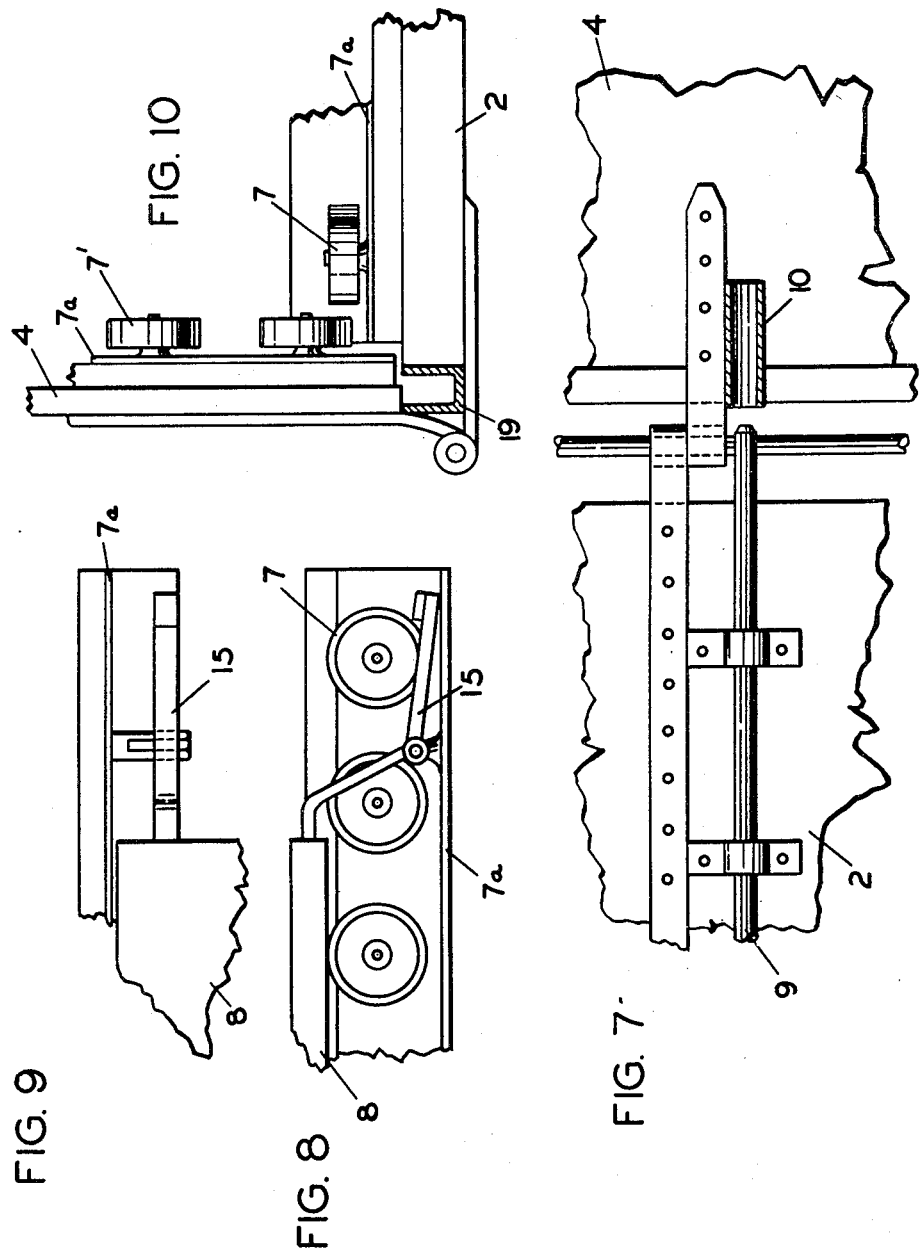
INVENTOR.
BY John W. Kappen
F. L. Walker

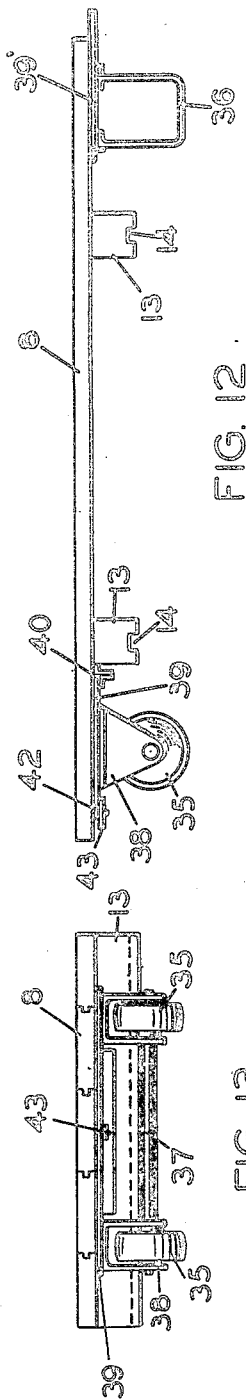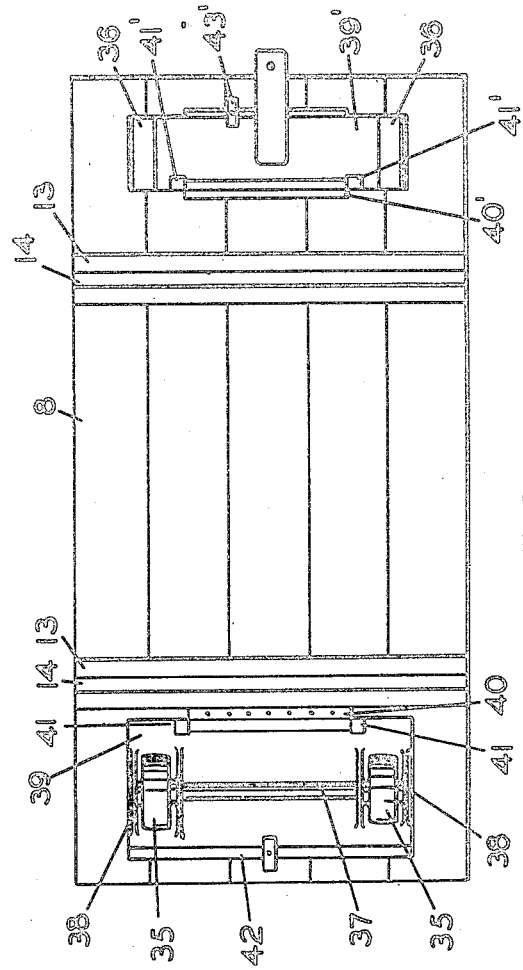

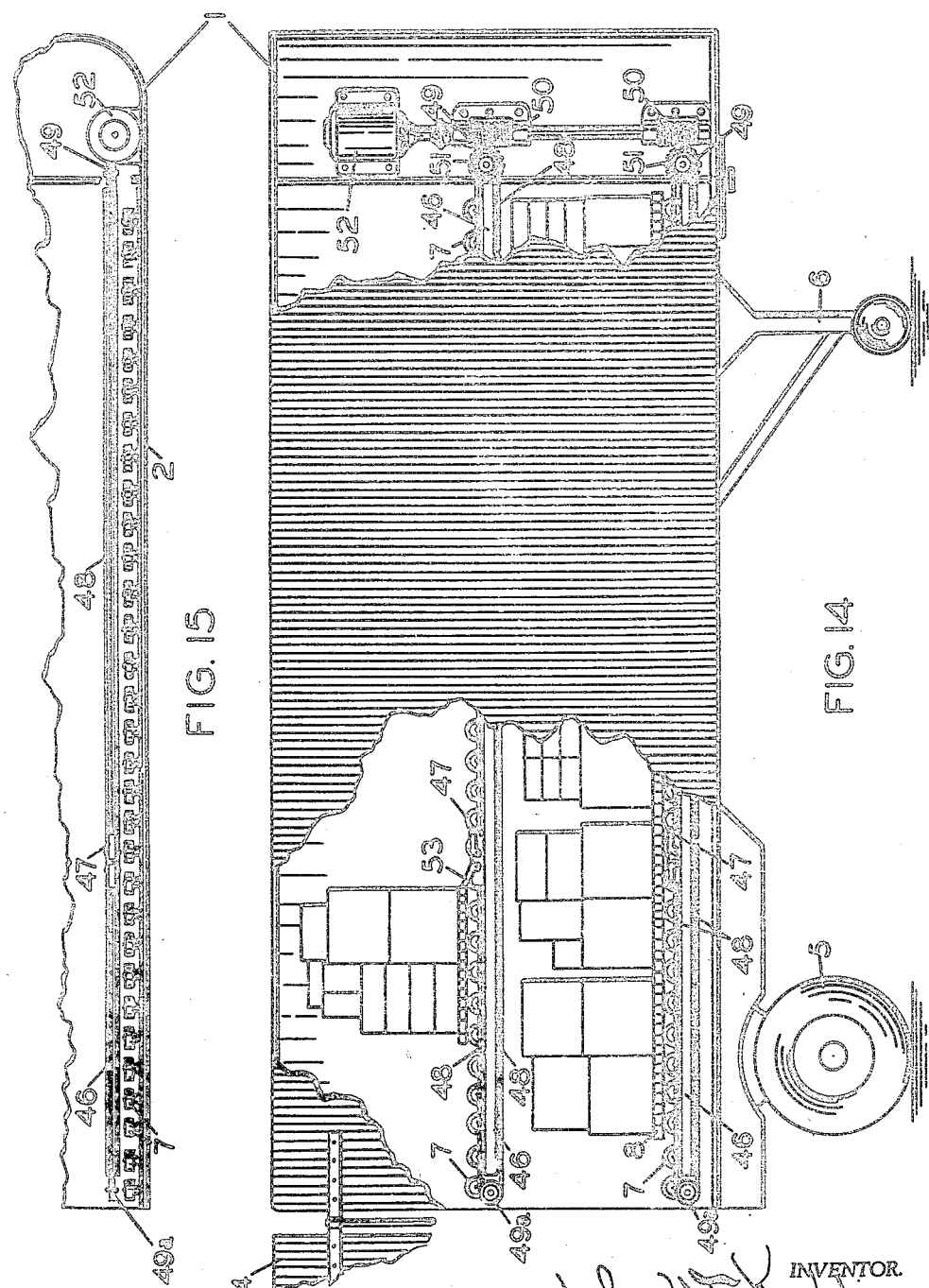

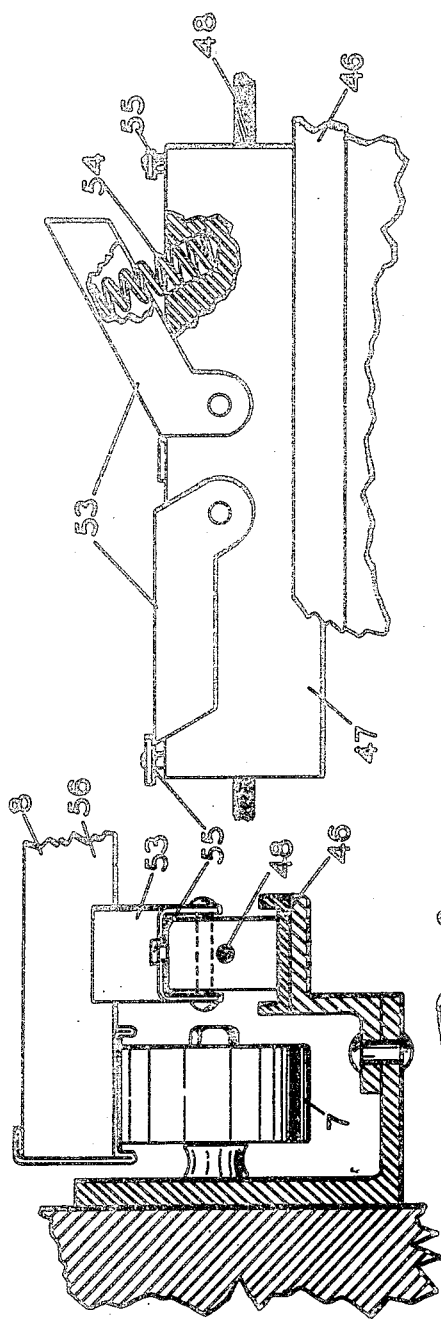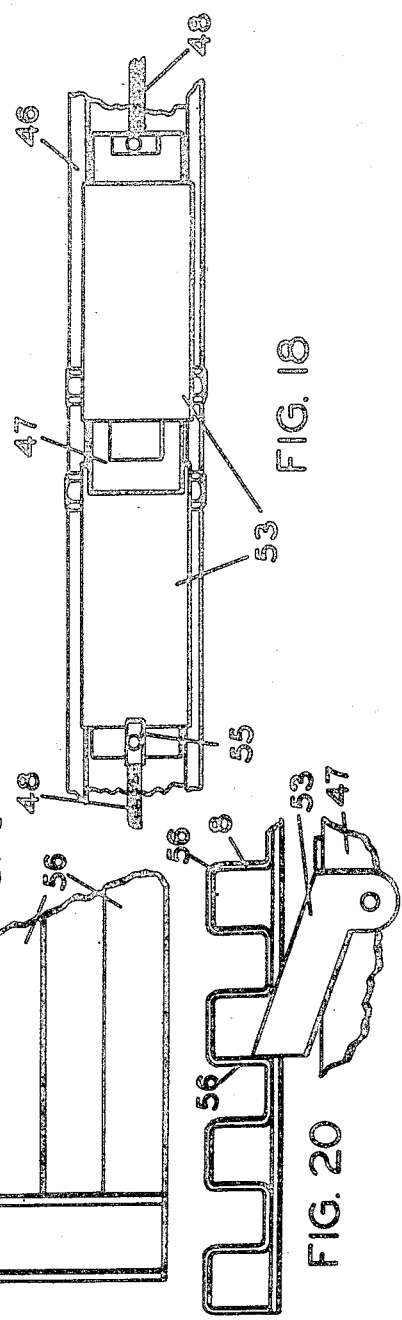

Patented Sept. 12, 1950

2,521,727

UNITED STATES PATENT OFFICE 2,521,727

MATERIAL HANDLING APPARATUS

John W. Kappen, Dayton, Ohio

Application August 7, 1945, Serial No. 609,448

32 Claims. (Cl. 214—75)

This invention pertains to material and article handling methods and apparatus and more particularly to transport and delivery vehicle loading, stowage, and unloading means. There is contemplated a systematic arrangement for compactly, but accessibly stowing a cargo of separate assortments or partial load lots of goods for sequential delivery to a plurality of different consignees or to separated delivery points.

The primary purpose is to conserve time and space and minimize labor of loading and unloading separable allotments of goods. To such end the separate consignments are arranged within the storage compartment of the vehicle in superposed tiers for travel movement to and from a power operated elevator embodied in the vehicle by which the assorted lots of goods are raised and lowered, with minimum effort of the driver or operator.

The object of the invention is to improve the construction as well as the means and mode of operation of material and article handling apparatus, whereby it may not only be economically manufactured, but will be efficient in use, capable of being easily operated, and be unlikely to get out of repair.

A further object of the invention is to enable a large number of separate lots or shipments of goods to be compactly but accessibly stored in a transport vehicle in superposed tiers for sequential discharge.

A further object of the invention is to provide an improved elevator, for readily and rapidly hoisting the separate lots of goods to the different tiers in which they are to be stored, and for receiving the separate shipments therefrom for lowering to the ground.

A further object of the invention is to provide improved means for applying power to the elevator, and for movably supporting the stored shipments for travel movement onto and off the elevator.

A further object of the invention is to provide a material and article handling apparatus having the aforementioned advantageous structural features and inherent meritorious characteristics and mode of operation herein set forth.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

Referring to the accompanying drawings, wherein is illustrated the preferred but not necessarily the only form of embodiment of the invention, Fig. 1 is a longitudinal sectional view of a conventional type tractor trailer, with the terminal doors thereof open, in which the present invention has been incorporated.

Fig. 3 is a rear elevation thereof.

Figs. 5 and 6 are detail side and plan views of the wall and door rollers in approximate relation with the door hinge.

Fig. 7 is a fragmentary exterior view of the door hinge and lock.

Figs. 8 and 9 are detail side and plan views of a pallet detent.

Fig. 10 is a detail plan view corresponding to Fig. 6 with the door closed.

Fig. 11 is a bottom plan view of one of the loading pallets.

Figs. 12 and 13 are respectively side and end elevations thereof.

Fig. 14 is a side elevation partly broken away, illustrating the application of motive power for actuating the loaded pallets to and fro.

Fig. 15 is a detail plan view thereof.

Fig. 16 is a detail side elevation of the conveyor slide for moving the pallets.

Fig. 17 is an end elevation on the pallet conveyor and roller support.

Fig. 18 is a top plan view of the pallet conveyor slide.

Figs. 19 and 20 are fragmentary views of the under side of the pallet and a detail sectional view thereof showing spaced shoulders for engagement of the conveyor.

Like parts are indicated by similar characters of reference throughout the several views.

Figures 1, 2:
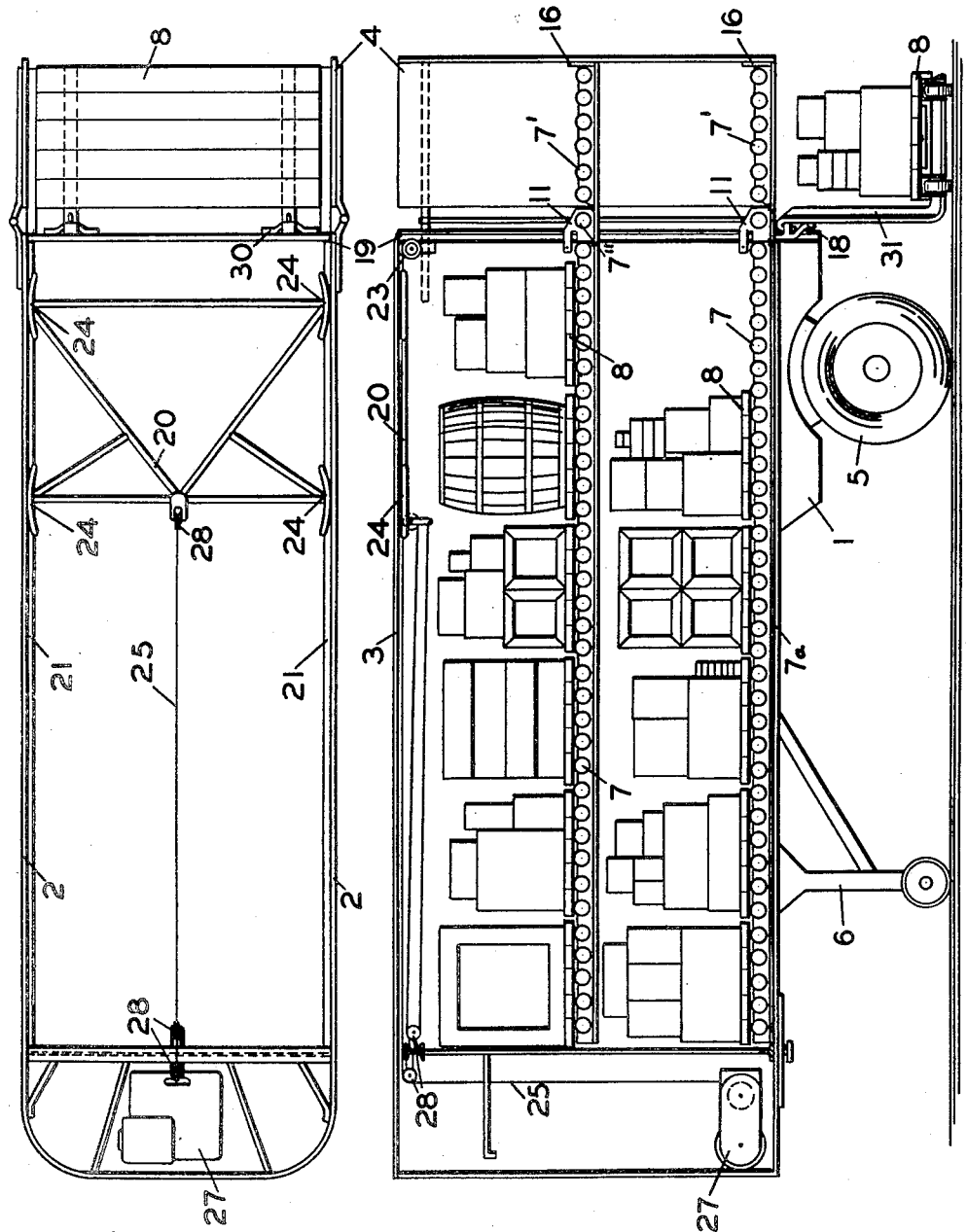
Fig. 2 is a plan view of the tractor trailer in which a part of the hoist apparatus is shown.
Figure 4:
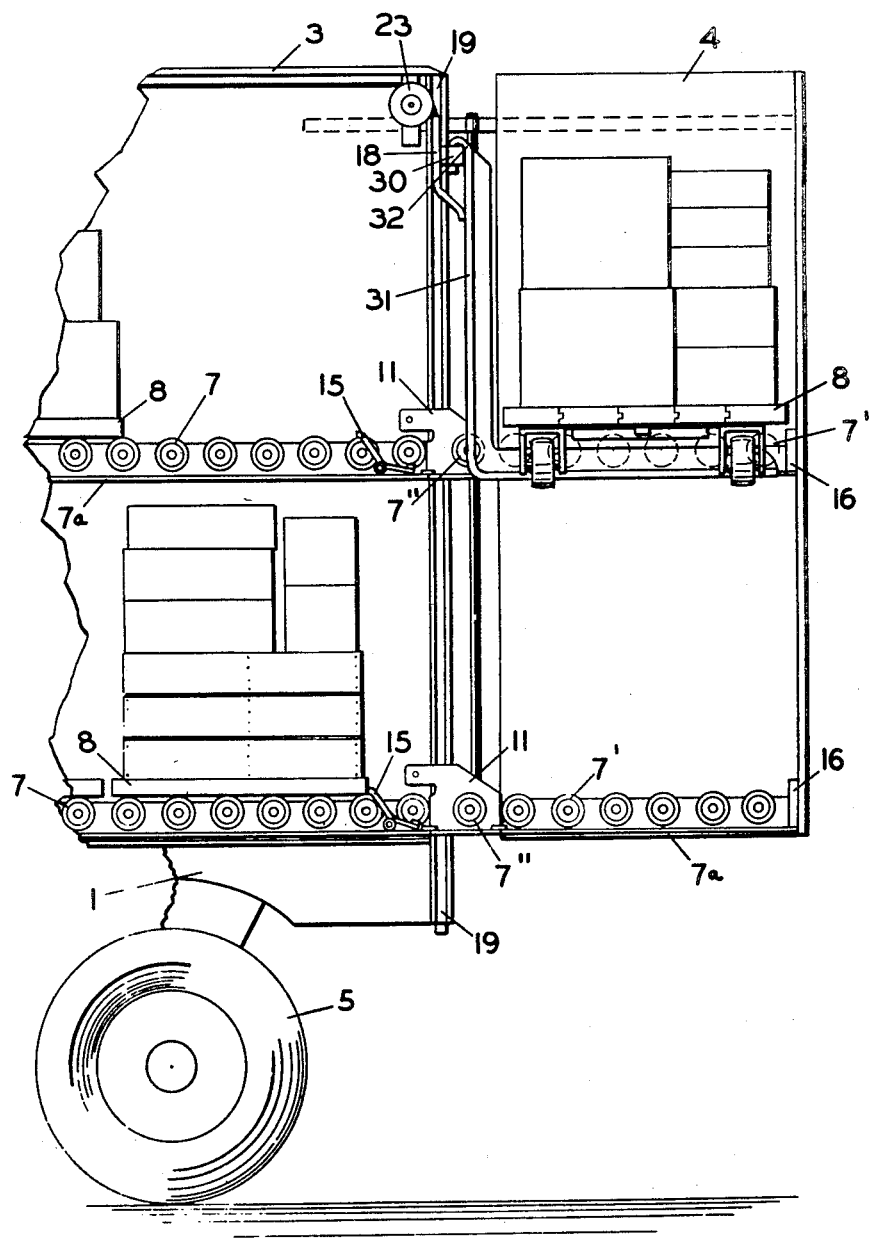
Fig. 4 is an enlarged interior elevation of the side wall and rear door with a loaded pallet being lifted therefrom.

Referring to the accompanying drawings, 1 indicates a conventional trailer van or truck having side walls 2, a top 3 and swinging rear doors 4. The trailer van is supported on rear carrying wheels 5 and the usual retractable standard 6 while detached from its tractor unit.

Mounted on the interior side walls 2 at vertically spaced intervals are series of horizontally aligned rollers 7—7 coincident with angle bars 7a to movably support a plurality of independent traveling article carriers or separate goods pallets 8. The rear swinging doors carry upon their inner sides continuations 7' of the several series of horizontally aligned pallet supporting rollers 7. When the doors 4 are opened to parallel relation the successions of supplemental rollers 7' on the insides of the doors 4 align with the series of rollers 7 on the inner sides of the vehicle sides 2 in common planes whereby the article carrying pallets 8 may travel in continuing course over the rollers 7 onto the door supported rollers 7'. The swinging doors are locked in their extended parallel relation, wherein the series of rollers 7' are aligned in common planes with the series of rollers 7, by manually reciprocatory lock bolts 9 mounted out side the trailer walls 2 and engageable in keepers 10 on the outside of the swinging doors 4. The bolts 9 are adjusted into and out of door locking position by projecting handles 9'.

To preserve the continuity of the rollers across the hinge space between the doors 4 and side walls 2 when the doors are extended, swinging members 11 which carry supplemental rollers 7" are pivoted to the interior of the side walls 2 and are swingingly adjustable to present the rollers 7" in alignment with the rollers 7 and 7' therebetween.

A series of independent article carrier units or pallets 8 are supported on the oppositely disposed series of rollers 7 for to and fro travel. Such pallets 8 comprise platforms each to receive an allotment of goods, and are sufficiently wide to easily enter and roll to and fro intermediate the side walls 2 of the vehicle compartment. While the width of the pallets 8 is proportionate to the width of the compartment, the fore and aft dimension thereof may be varied according to the character of the goods or articles being handled. Attached to the undersides of the pallets 8 are reinforcing cleats 13, a part of which are preferably grooved, at 14, on their bottom surfaces. When the doors 4 are extended and locked in parallel relation, the pallets 8 may roll to and fro on the succession of rollers 7, and from there onto the continuing series of rollers 7' on the inner sides of the doors 4. Releasable stops 15 arrest the travel of the pallets and confine them to the initial series of rollers 7 within the limit of the compartment. Withdrawal of the stops 15 permits the aforementioned continued travel of the pallets upon the door carried rollers 7'. Permanent stops 16 arrest the travel of the pallets relative to the latter supporting rollers.

At the rear of the compartment, just within the doors 4 when closed, is an elevator bar 17 extending across the compartment, and provided with vertical shoes 18 at each end slidingly engaging vertical channel tracks 19 on the interior side walls 2 at the extreme rear margins of the truck body.

The elevator bar 17 is interconnected for unison operation with a reciprocatory equalizer frame 20 sliding horizontally in guides or tracks 21 at the tops of the side walls 2 closely adjacent to the cover 3. The elevator bar is connected with the equalizer frame by parallel cables 22 attached to the elevator bar 17 at 22a and passing over sheaves or pulleys 23 at the juncture of the vertical guides 19 for the elevator bar, and the horizontal guides 21 of the equalizer frame 20 to which the opposite ends of the cables are attached at 20a. The latter is provided with spaced shoes 24 engaging the guides 21 to maintain the aligned relation of the equalizer frame 20. The equalizer frame 20 is connected with a power driven winch 27 or hoist apparatus by a single cable 25 passing about a series of sheaves or pulleys 26. The winch 27 is preferably equipped with an electric motor 26, controlled by a push button at the rear of the vehicle in easy reach of the operator while loading or unloading. The push button may be connected into a flexible electrical cable to be plugged into a socket or outlet connection on the vehicle, whereby the push button may be carried within range of its cable length by the operator. By energizing the winch or hoisting apparatus to retrieve the cable 25, the equalizer frame is drawn forwardly to elevate the elevator bar 17 while maintaining it in uniformly horizontal relation. By reversing the hoisting apparatus 27 the elevator bar may be lowered.

The elevator bar 17 is provided with spaced loops or keepers 30 for detachable engagement therein of reversely bent upper ends 32 of L-shaped hanger bars 31. The hanger bars 31 are preferably structural steel T bars of relatively small cross sectional dimensions, and are of sufficient length to extend into proximity with the ground when the elevator 17 is in its lowermost position.

The rear doors 4 being locked in open or extended parallel relation by the exterior bolts 9, the rearmost pallet or carrier unit 8 is rolled rearwardly on the rollers 7 and thence onto the door carried rollers 7' where it is arrested by the stops 16 on the doors. The winch 27 is operated to retrace the cable 25 and with it the reciprocatory equalizing frame 20.

The movement of the frame 20 draws the elevator bar 17 and the L-shaped hanger bars 31 attached thereto upwardly until the horizontal arms 34 of the hanger bars engage beneath the door supported pallet, which is thereby slightly lifted off the door carried supporting rollers 7'. Thereupon the doors 4 are unlocked by retraction of the locking bolts 9 and are swung outwardly to remove the rollers 7' from the path of descent of the pallet 8 and contents then supported wholly upon the L-shaped hanger bars 31. Before the pallet is lowered a pair of detachable wheels 35 and a pair of struts or feet 36 are secured to the underside of the suspended pallet. By reversal of the winch 27, the wheel and strut equipped pallet are lowered to the ground, and by slight continued lowering of the elevator and hanger bars the latter is disengaged from the loaded pallet, which may then be moved about upon its wheels 35 and supporting struts 36.

The detachable wheels 35 are mounted on a common axle 37, in relatively spaced brackets 38, dependent from a mounting plate 39. One edge of the latter is engageable between an under hanging flange 40 and the underside of the pallet 8. Two spaced studs or lugs 41 on the underside of the pallet serve to longitudinally locate the mounting plate 39. The opposite edge of the wheel mounting plate 39 is engaged in abutting relation with a locating strip 42 in parallel spaced relation with the underhanging flange 40, and is secured by a rotary turn button 43, revoluble into overlapping relation with the mounting plate 39. The struts or feet 44 are detachably engageable with the bottom of the pallet 8 in exactly the same manner. These struts 36 are preferably, but not necessarily, substantially U-shaped runners which are secured in spaced relation to a mounting plate 39', one edge of which is detachably engageable intermediate under hanging spaced flange 40' and the bottom of the pallet 8, while the opposite edge of the mounting plate is engaged in abutting relation with a locating strip 42' on the bottom of the pallet where it too is secured by a turn button 43'. Stops or lugs 41' serve to locate the mounting plate 39' longitudinally of the pallet 8.

The wheels 35 and feet or struts 36 having been engaged with the loaded pallet while it is suspended upon the L-shaped hanger bars, after which the equipped and loaded pallet is lowered to the ground, the pallet may be transported on the wheels to any desired point. For this purpose a conventional wheeled dolly or jack 44 having a tongue 45 may be engaged beneath one end of the pallet. By leverage action on the tongue, the pallet is lifted sufficiently to raise the feet 36 slightly from the ground whereupon the loaded pallet may be propelled upon its wheels 35 by the tongue 45.

In loading the vehicle by stowing loaded pallets therein the method of operation is reversed. The elevator 17 having been lowered until the hanger bars 31 are in proximity with the ground, the loaded pallet is positioned over the horizontal lifting arms 34 thereof with the medial perpendicular flanges of the hanger bar arms 34 in registry with the grooves 14 of the pallet cleats 13. The flanges on the elevator hanger bars 31 thus serve to center the loaded pallet with the compartment and opposing series of rollers 7 in position to readily and easily enter the compartment. The winch 27 is energized to lift the positioned pallet slightly above the level of the series of rollers 7—7. The detachable wheels 35 and feet 36 are removed, and the doors 4 are swung inwardly to parallel relation and locked in adjusted relation with their rollers 7' beneath the opposite ends of the pallet. The winch 27 is then reversed to lower the elevator 17 and hanger bars 31, leaving the loaded pallet resting upon the door carried rollers 7' from which it may be rolled onto the continuing series of rollers 7, in sequence with previously loaded pallets.

Obviously the common axle shaft 37 of the carrier wheels 35 may be omitted, and the wheels may be swiveled by pivoting the wheel brackets 38 to the mounting plate 29 for rotation about a vertical axis. Such construction will facilitate the positioning of the pallets over the lift arms 34 for loading into the vehicle. Also in lieu of providing successions of rollers 7 on the inner sides of the vehicle walls 2 and additional rollers 7' upon the doors, rollers may be attached to the opposite ends of the pallets 8 and be made to roll upon the angle bars 7a as tracks in their to and fro travel. Likewise in lieu of a winch operated cable hoist, the elevator 17 may be connected with reversable motor actuated vertical screws for raising and lowering the elevator.

Although for most purposes the vehicle will be preferably loaded and unloaded at the rear, while the pallets are movable to and fro in a fore and aft direction, as illustrated, there may be conditions of use wherein it will be desired to load and unload from the side. In such case pairs of swinging doors 4 will comprise the side walls of the vehicle, and the tiers of pallet supporting rollers 7 will be arranged transversely of the vehicle upon which a lesser number of pallets 8 or pallets of lesser size may travel from side to side. Supplemental rollers 7' would be provided on the inner sides of the doors as illustrated, and cooperating elevator means actuated by the winch 27 would function as before described in lifting the loaded pallets 8 to and from elevated position where they are engageable upon transverse tiers of the rollers 7. The structure and operation being the same whether the loading and unloading is performed at the rear or the side of the vehicle, illustration thereof would be substantially duplication of the present showing. Therefore, it is believed that further illustration would be superfluous and merely add unnecessarily to the drawings.

The motor 26 is reversible, or reversing transmission mechanism is interposed between the motor 26 and the winch 27, whereby the elevator mechanism can be reversely operated at will. The same reversible power actuating mechanism may be also utilized for moving the loaded pallets 8 to and fro toward and from loading and unloading position. Such power actuation of the pallets is especially desirable when the vehicle is standing on a hillside or in an inclined position, whereby the pallets tend to roll in one direction by gravity but are difficult to move in the opposite direction.

In Figs. 14 to 18 there is illustrated such power actuation of traveling loaded pallets to and fro within the storage compartment. Disposed in parallel adjacent relation with each tier of carrier rollers 7 upon which the load pallets are movably supported is a guide track 46, Figs. 15 and 17, on each of which is mounted for to and fro sliding motion beneath the ends of the pallets 8 a tractor slide block 47. The tractor blocks 47 are each interconnected in corresponding endless conveyor cables 48, which travel to and fro about spaced guide pulleys 49—49a at opposite ends of the guide tracks 46. The cable pulleys 49 at the forward end of the guide tracks 46 are power driven by a motor actuated worm and gear mechanism 50—51, which for illustrative purpose is shown actuated by a reversible motor 52, but which, as before mentioned, may be operatively connected with the elevator motor 26 for duofunctional use of the latter. The conveyor motor 52 may be operated by a second electrical circuit control button on the elevator motor control cable before mentioned. By operation of the motor 52 in alternate directions the conveyor cables 48 may be actuated at will first in one direction and then in the other, and arrested at any desired position by stopping the motor.

Each tractor slide block 47 is provided with a pair of oppositely disposed pivoted pawls or clutch dogs 53 independently spring pressed upwardly into engaging relation with the overlying portions of the pallets by helical springs 54. They are normally held depressed against the influence of the elevating springs 54 by manually operable turn buttons 55.

In operation the motor 52 is energized to propel the cables and slide blocks rearwardly into convenient reach of the operator at the rear of the vehicle. If the movement of the loaded pallets toward the rear, i. e., unloading movement, is desired, the operator turns the detent button 55 to release the rearwardly directed pawls or dogs 53 pertaining to the particular tier of loaded pallets to be moved. The panels or dogs are raised to pallet engaging positions by the springs 54. Upon reversing the motor drive to actuate the cables and conveyor slide blocks forwardly, the elevated pawls or dogs 53 will pass idly under one or more pallets 8 until the conveyor cable movement is again reversed. The under sides of the pallets are provided with a succession of spaced shoulders or stops 56, Fig. 19, in the paths of the pawls or dogs 53 with which the elevated ends thereof engage to advance the pallet in unison with the travel of the cables 48 and tractor blocks 47 until arrested by deenergization of the motor 52. If only one pallet is to be unloaded, the motor is reversed while the pawls 53 are beneath the first pallet of the series. If, however, plural pallets are to be removed, the tractor blocks 47 and elevated pawls or dogs 53 may be permitted to continue past the initial pallet of the series and under a succeeding pallet before the direction of travel of the cables 48 and tractor blocks 47 is reversed, whereupon several of the loaded pallets may be simultaneously shifted toward the rear of the vehicle within reach of the operator to be subsequently loaded one by one onto the elevator and lowered to the ground.

For loading the commodity carrying pallets, the rearwardly directed pawls or dogs upon the tractor blocks 47 are manually depressed against the tension of their springs 54 and locked by adjustment of their turn buttons 55, while positioned at the extreme rear of the vehicle within reach of the operator. At the same time, the forwardly directed pawls or dogs 53 are released and permitted to rise under influence of their springs 55 into position to engage overlying pallets. The loaded pallet having been raised by the elevator and received on the door carried rollers 7', is manually pushed thence onto the carrier rollers 7 over the tractor blocks 47, the forwardly directed pawls 53 of which will automatically engage the lugs or shoulders 56 thereof from their rearward sides. Upon starting the motor 52 to impart forward travel motion to the cables 48, the engaged pallet is propelled forwardly until it reaches the forward limit of its range of travel in proximate relation with previously loaded pallets of the same tier. Upon reversal of the motor and direction of travel of the cables 48 and tractor blocks 47, the pawls or dogs are automatically disengaged from the positioned pallet and retracted idly rearwardly preparatory to reengagement with another loaded pallet.

Such power motive apparatus for the pallets have another useful function when the vehicle is standing upon an inclined roadway whereby the pallets tend to roll by gravity in one direction or the other. In such case the pawls upon the tractor blocks are engaged with the pallet at the down grade side thereof to resist gravity travel of the pallet, and the motor 52 is operated to feed the cables 48 in the same down grade direction in which the pallets tend to roll. However, being engaged with the cables by the pawls, the travel of the pallets under influence of gravity is thereby restricted to the speed of the cables under control of the motor. Thus, by means of the motive power system described, the loaded pallets may be caused to travel under applied power control singly or in multiple in either direction while subject to control of the operator. If being operated on down grade, their movement under influence of gravity in either direction can likewise be regulated and controlled by the operator.

The pallets 8 illustrated in Figs. 11, 12 and 13 are of wood, against one marginal edge of which the tractor pawls 53 engage as shown in Fig. 14 to move the loaded pallets or restrain their movement under influence of gravity, as before described. To minimize their weight and increase the strength of the pallets, they may be made of metal, preferably aluminum, formed into a succession of corrugations or alternating channels 8a affording spaced shoulders 56, as shown in Figs. 19 and 20. In such embodiment, tractor pawls or dogs 53 may make engagement with any one of the spaced shoulders 56 comprising the sides of the channels 8a on the under side of the metal pallet.

Whether constructed of wood, as in Figs. 11, 12 and 13, or of corrugated metal, as in Figs. 19 and 20, the ends of the pallets 8 are shod or reinforced by being enclosed in metal channels 57 which straddle and overlie the pallet ends. The under side of such terminal shoe or reinforcing channel 57 is formed with parallel spaced flanges 58, which define an inverted track within which the supporting rollers 7, 7' and 7" make contact with the overlying ends of the pallets 8. The flanges 58 further function to limit any side shift motion of the pallets 8 when the vehicle is in a tilted position on a hillside, or when traveling at high speed upon a curved roadway, and thus prevent engagement of the pallet ends with the side of the vehicle or storage compartment and undue friction or resistance to their to and fro travel movement in either direction. The engagement of the flanges 58 with the lateral margins of the supporting rollers serve to temporarily suspend the pallets in an inclined position when the vehicle is on a transverse incline, and so restrict bodily shifting motion thereof.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A material handling vehicle, including a vehicle body, a storage compartment therein, series of longitudinally aligned rollers on the opposite walls thereof, a pair of oppositely swinging closure doors for the compartment, an aligned series of spaced rollers on the inner side of each door, aligned with the series of rollers within the compartment when the doors are open to extended parallel relation, a plurality of traveling article carrier units movable to and fro on the series of rollers within the compartment and thence onto the series of rollers carried by the doors when the latter are in extended parallel relation and vice versa, an elevator mounted on the vehicle, horizontal support arms on the elevator engageable beneath a carrier unit while supported on the door carried rollers, detachable carrying wheels engageable with the carrier unit while in suspended position, upon which the carrier unit may be transported after deposit from the vehicle, and interengaging portions upon the elevator supporting arms and upon the carrier unit, by which the carrier is engaged therewith in position to be aligned with the series of rollers on the compartment walls and doors, and means for actuating the elevator.

2. A merchandise handling structure including a storage compartment having relatively spaced horizontal guide ways, a pair of closure doors therefor extendable into parallel spaced relation when open, guide way extensions across the inner sides of the doors aligned with those of the storage compartment when the doors are open, a series of independent carrier units mounted for horizontal travel motion to and fro upon the compartment guide ways and door supported extensions thereof, and an elevator positioned to lift the article carriers vertically beyond the ends of the compartment guide ways, into and out of the descending path of which the door carried guide way extensions are movable by swinging motion of the doors.

3. A merchandise handling structure, including a storage compartment, relatively spaced parallel horizontally disposed fixed guide ways therein, horizontal guide way extensions movable into and out of aligned relation with the parallel fixed guide ways, a traveling carrier unit movable to and fro from the fixed compartment guide ways on to the extensions thereof when aligned and vice versa and an elevator for vertically lifting the carrier unit relative to the guide ways and for supporting the carrier unit in elevated suspended relation while the guide way extensions are moved into and out of position there beneath.

4. A vehicle loading, storage and unloading apparatus, including a vehicle body, storage compartment therein, a plurality of vertically spaced parallel horizontal guide ways on the interior sides of the vehicle, a pair of laterally swinging closure doors at the rear of the storage compartment, guide way continuations upon the inner sides of the doors aligned with the guide ways of the storage compartment when the doors are in extended parallel open position, traveling carrier units movable to and fro upon the compartment guide ways and thence onto the door carried continuations thereof, and vice versa, an elevator mounted on the vehicle engageable with a carrier unit upon the door supported guide way extensions for lifting the carrier unit therefrom and lowering it to the ground and vice versa, the guide way extensions being laterally movable into and out of the vertical path of the carrier unit upon the elevator to engage and disengage the carrier unit by swinging movement of the doors.

5. A material handling structure including a storage compartment, vertically spaced parallel horizontal guide ways therein, swinging doors for the compartment, guide way extensions upon the inner sides of the doors in aligned relation with those of the compartment when the doors are open, traveling carrier units movable to and fro upon the compartment guide ways onto the door carried guide way extensions and vice versa, onto and from which guide way extensions the carrier units are movable, and locking means for temporarily securing the doors in extended parallel relation.

6. A material handling structure, including a storage compartment, relatively spaced parallel horizontal guide ways within the compartment, guide way extensions adjustable about a vertical axis into aligned relation with the compartment guide ways projecting beyond the compartment, a traveling carrier unit movable to and fro upon the compartment guide ways and thence onto the guide way extensions and vice versa, and hoist means for lifting the carrier unit onto and off the guide way extensions beyond the compartment.

7. A material handling apparatus including a storage compartment, a carrier unit movable to and fro therein, a support extendable beyond the compartment onto which the carrier unit is movable from the compartment and vice versa, a hoist means operable to deposit the carrier upon said support when extended and remove it therefrom, said extended support being retractable about a vertical axis out of and into a position beneath the carrier unit while the latter is supported by the hoist in elevated relation thereabove.

8. A material handling structure including a storage compartment, a pair of doors therefor extendable into parallel spaced relation, horizontal fixed guides mounted in spaced relation within the compartment, movable guide extensions carried by the doors and presented in aligned relation with the guides within the compartment when the doors are extended, a plurality of load carrying traveling pallets movable to and fro upon the guides within the compartment and thence onto the guide extensions carried by the doors, a power operated elevator positioned intermediate the planes of the guides upon the doors when extended adapted when operated to lift loaded pallets onto and off the door supported guides, and power operated means for transmitting travel motion of the pallets along the guides within the compartment toward and from the door supported guide extensions.

9. A material handling apparatus including a storage compartment, a pair of doors therefor, complementary guides within the compartment and carried by the doors in aligned relation with those within the compartment when the doors are opened to substantially parallel relation, and a series of traveling load carrying pallets movable along the guides from within the compartment onto the door carried guides, and vice versa, and lifting means for lifting loaded pallets onto and off the door carried guides for travel motion on the compartment guides toward and from the door carried guides.

10. A material handling apparatus including a storage compartment, parallel guides located therein, laterally swinging doors for the compartment, guide way extensions carried by the doors in positions aligned with the compartment guides when the doors are extended in parallel relation, a load carrying pallet mounted for travel motion to and fro upon the compartment guides and thence onto the door carried guides when aligned with the compartment guides, and supporting means for the load carrying pallet for temporarily holding the pallet in elevated relation above the level of the door carried guides while said guides are moved into and out of pallet receiving relation beneath the elevated pallet by lateral swinging movement of the doors.

11. A material handling apparatus including a storage compartment, guide ways stationarily located therein, guide way extensions laterally adjustable into and out of aligned relation with the compartment guide ways, a traveling load carrying pallet movable to and fro upon the compartment guideways and guide way extensions when aligned with the compartment guide ways, and an elevator engageable with the load carrying pallet for lifting the pallet onto and off the adjustable guide way extensions which are laterally adjustable into and out of cooperative relation with the pallet.

12. A material handling vehicle, including a storage compartment, guide ways at least a portion of which extend within the compartment, traveling load carrying pallets movable to and fro upon the guide ways, an elevator engageable with the load carrying pallets for lifting the pallets onto and off the guide ways, and power means for actuating the pallets to and fro within the compartment upon said guide ways.

13. A material handling vehicle including a storage compartment, swinging doors therefor, guide ways within the compartment and extending thence across the doors in aligned positions when the doors are open, traveling load carrying pallets engageable upon said guide ways for to and fro motion, an elevator for elevating the load carrying pallet to and from an elevated position wherein portions of the guide ways are engageable and disengageable beneath the elevated pallet by swinging adjustment of the doors.

14. A material handling apparatus including a storage compartment, guide ways therein, load carrying pallets engageable upon the guide ways for to and fro motion within the compartment, an elevator with which the pallets are engageable for vertical movement into and out of engaging relation with the guide ways, and a power actuating means engageable with the pallets while upon the guide ways for moving the pallets thereon toward and away from engaging relation with the elevator.

15. A material handling apparatus including a storage compartment, vertically spaced guide ways therein, load carrying pallets mounted on the guide ways for travel motion to and fro thereupon, an elevator for lifting the pallets to and from position for operative engagement with selected guide ways, and adjustable extensions of the guide ways movable into and out of engaging relation beneath the pallets.

16. A material handling apparatus including a storage compartment, guide ways therein, load carrying pallets mounted on the guide ways for travel motion to and fro thereupon, conveyor cables disposed in parallel relation with the guide ways, motive means for actuating the conveyor cables to and fro, and reversible coupling means for connecting the pallets to the cables for unison travel motion, said coupling means being idly movable relative to the pallets in one direction of travel of the cable and automatically engageable therewith upon movement of the cable in the opposite direction for causing the pallets to travel in unison therewith.

17. A material handling apparatus including a storage compartment, guide ways therein, load carrying pallets mounted on the guide ways for travel motion to and fro thereupon, a tractor member movable to and fro in a path parallel with said guide ways, a reversible coupling for connecting a pallet thereto for unison travel motion, including a pair of oppositely directed pawls each engageable with a pallet when moving in one direction, and movable independently of the pallets when traveling in the opposite direction, means for manually adjusting one of said pawls for operative engagement with a pallet and for rendering the other pawl inoperative at the will of the operator, and actuating means for moving the tractor member in alternating directions.

18. A material handling apparatus including a storage compartment, guide ways therein, load carrying pallets mounted on the guide ways for travel motion to and fro thereupon, an elevator engageable therewith for lifting the pallets onto and off the guide ways, a reversible actuator for propelling the pallets at will in alternating directions upon the guide ways toward and from the elevator engaging position, motive means for the actuator, and a reversible coupling between the actuator and a pallet.

19. Article handling apparatus, including a plurality of independent pallets to carry separate portions of material or articles to be carried, a storage space for loaded pallets, stationary guide ways extending within the storage space upon which the loaded pallets are movable to and fro, continuations of the said guide ways mounted for adjustment into and out of aligned relation with the stationary guide ways, a hoist by which the pallets may be elevated above the level of the stationary guide ways, the adjustable continuations of the guide ways being movable into and out of the path of descent of the elevated pallet, the construction and arrangement being such that the elevated pallet may be lowered into travel engagement with the positioned adjustable guide way extensions for movement thence onto the stationary guide ways into the storage space, or optionally lowered relative to and independently of the guide way extensions to the ground.

20. A material handling apparatus, including a storage compartment, guide ways therein, load carrying pallets mounted on the guide ways for to and fro travel, an elevator engageable with the pallets for lifting the pallets onto and off the guide ways, and interengaging portions on the pallets and guide ways restricting relative motion thereof transversely to the direction of their to and fro travel while permitting said to and fro relative travel motion thereof on said guide ways, the construction and arrangement being such that the pallets will be temporarily suspended upon the guide ways when in a tilted position transversely to their direction of to and fro travel movement.

21. A merchandise handling vehicle, including a vehicle body, a storage compartment therein, vertically spaced guide ways therein secured to the opposite sides of the vehicle body in closely adjacent relation thereto, a series of rollers mounted in the respective guide ways upon which a series of merchandise carrying pallets may be adjustably supported for to and fro movement relative to the vehicle body, the construction and arrangement being such that the central portion of the vehicle body is unobstructed, and movably mounted pallet supporting means for vertically and transversely aligning a merchandise carrying pallet with said guide ways.

22. A merchandise handling vehicle, comprising a vehicle body, a storage compartment therein, means for adjustably supporting merchandise carrying pallets therein including parallel longitudinally extending guides upon which the merchandise carrying pallets are supported in vertically spaced relation with the floor of the vehicle storage compartment, said guides being secured to the side walls of the vehicle body thereby leaving the central portion of the vehicle body unobstructed, extensions for said guides pivotally mounted exteriorly of the compartment and movable to and fro into parallel relation with said guides and supporting engagement with said pallets, and a hoisting mechanism for moving said pallets into aligned relation with said compartment guides.

23. A merchandise handling vehicle, comprising a body portion, a storage compartment therein, means for movably supporting merchandise carrying pallets in the storage compartment, including independent pallet supporting means extending longitudinally of the vehicle body and secured to the opposite side walls thereof in a common horizontal plane, and a series of independent rollers carried by said supporting means upon which the pallets are supported independently of the vehicle floor and in vertically spaced relation therewith, and pallet supporting extensions mounted exteriorly of the compartment for lateral shifting movement into and out of parallel relation with the pallet supporting means to facilitate the loading and unloading of pallets within the compartment.

24. A merchandise handling vehicle, comprising a body portion, a storage compartment therein, means for movably supporting merchandise carrying pallets in the storage compartment, including independent fixed pallet supports extending longitudinally of the vehicle body and secured thereto in closely adjacent relation with the opposite side walls thereof, pallet engaging surfaces thereon upon which the pallets are movable longitudinally of the vehicle body in vertically spaced relation with the floor thereof, the construction and arrangement being such that the pallets are supported at their extremities adjacent the side walls of the vehicle thereby, leaving the central portion of the vehicle body unobstructed by pallet supporting means, and laterally shiftable pallet supports mounted exteriorly of the compartment having pallet engaging surfaces thereon, said shiftable supports being movable into aligned relation with the fixed supports for supporting the pallets during the loading and unloading thereof.

25. Apparatus in and forming a part of a merchandise transporting vehicle for facilitating the loading, transporting and removal of individual merchandise supporting pallets, including parallel longitudinally extending continuous guide supports secured to the internal side walls of the vehicle, the interior of the vehicle being unobstructed except for said guide supports whereby to permit entrance for the individual placement and removal of the pallets which are arranged with their ends slidably resting on the guide supports, an elevator member, temporary pallet supporting members movably mounted thereon for lifting the pallets onto and off the guide supports, and means for aligning the elevator supported pallets with the guide supports.

26. Apparatus for facilitating the loading, transporting and removal of individual merchandise supporting pallets in connection with a merchandise transporting vehicle providing an enclosed storage compartment, including parallel longitudinally extending continuous guide supports secured to the side walls of the storage compartment, the interior of the storage compartment being unobstructed except for said guide supports whereby to permit entrance for the individual placement and removal of the pallets which are arranged with their ends slidably resting on the guide supports, means on the pallets interengageable with said guide supports to inhibit lateral motion from side to side of the storage compartment and laterally shiftable guide support extensions, which in cooperation with an elevator unit, align the pallets with said guide supports.

27. A merchandise handling structure, including a storage compartment, relatively spaced parallel horizontally disposed fixed guideways therein, pivotally mounted guideway extensions movable into and out of aligned relation with the parallel fixed guideways, and a traveling carrier unit movable to and fro from the fixed compartment guideways on to the extensions thereof when aligned and vice versa.

28. A merchandise handling structure, including a storage compartment, relatively spaced parallel horizontal guideways within the compartment, a traveling carrier unit movable to and fro upon the guideways, a hoist mechanism for lifting the carrier unit into position for engagement upon the horizontal guideways, and guideway extensions mounted exteriorly of the compartment and movable into and out of alignment with said compartment guideways, the traveling carrier unit being movable to and fro from the compartment guideways on to the extensions thereof when aligned and vice versa.

29. A merchandise handling structure, including a storage compartment, spaced parallel guideways within the compartment, a traveling carrier unit movable to and fro upon the guideways, and a lifting mechanism for elevating the traveling carrier into position for engagement upon the guideways including a cross bar slidably mounted adjacent the rear of the storage compartment for vertical movement relative thereto, projecting arms carried thereby upon which the traveling carrier is supported during the lifting thereof, an equalizing member slidingly mounted adjacent the top of the compartment, and a hoisting unit operatively connected with the cross bar through the equalizing unit.

30. A merchandise handling structure, including a storage compartment, spaced guideways within the compartment, a traveling carrier unit movable to and fro upon the guideways, and means for lifting and lowering the carrier unit to and from the guideways including an elevator upon which the carrier unit is supported exteriorly of the compartment for movement into alignment with the compartment guideways actuating means therefor connected to the elevator adjacent opposite ends thereof, and an equalizing member extending transversely of the compartment and slidingly supported adjacent the top thereof for equalizing the influence of the actuating means upon the opposite ends of the elevator.

31. A material handling apparatus including a storage compartment, guideways therein, load carrying pallets engageable upon the guideways for to and fro motion within the compartment, an elevator with which the pallets are engageable for vertical movement into and out of aligned relation with the guideways, and oscillatory guideway extensions engageable with the pallets while on the elevator for supporting the pallets for movement toward and away from engaging relation with the guideways.

32. A material handling vehicle, including a storage compartment, guideways, at least a portion of which extend within the compartment, traveling load carrying pallets movable to and fro upon the guideways, an elevator for lifting the load carrying pallets onto and off said guideways, and pallet supports adjustably mounted on said elevator which when in adjusted position support said pallets during the lifting operation of the elevator.

JOHN W. KAPPEN.

REFERENCES CITED

The following references are of record in the file of this patent:

UNITED STATES PATENTS

| Number | Name | Date |
|---|---|---|
| 252,960 | Moore | Jan. 31, 1882 |
| 1,072,864 | Marvin | Sept. 9, 1913 |
| 1,727,547 | Knoll | Sept. 10, 1929 |
| 2,045,566 | Berg | June 30, 1936 |
| 2,088,122 | Taylor | July 27, 1937 |
| 2,146,436 | Lima | Feb. 7, 1939 |
| 2,146,533 | Erickson | Feb. 7, 1939 |
| 2,236,103 | Lohner et al. | Mar. 25, 1941 |
| 2,301,639 | Onstott | Nov. 10, 1942 |
| 2,421,128 | Pride | May 27, 1947 |